United States Patent [19]
de Sivry et al.

[11] 4,410,210
[45] Oct. 18, 1983

[54] RETAINING GRIPPERS

[75] Inventors: Bruno J. M. de Sivry, Paris; Olivier R. Anselme, Sevres; Bernard G. Sudreau, Puteaux; Meichel J. Jegousse, Saint Herblain; Yves R. Le Hir, Nantes; Daniel Josien, Willems, all of France

[73] Assignee: Compagnie Francais des Petroles, Paris, France

[21] Appl. No.: 311,803

[22] Filed: Oct. 15, 1981

[30] Foreign Application Priority Data

Oct. 24, 1980 [FR] France ............................. 80 22827

[51] Int. Cl.³ ............................................. B66C 1/46
[52] U.S. Cl. ................................. 294/99 R; 294/93; 294/102 R; 294/DIG. 2
[58] Field of Search ............... 294/63 A, 67 BA, 86 R, 294/86.1, 86.15, 86.24, 86.26, 86.3, 86.32, 93, 94, 99 R, 102 R, 102 A, DIG. 2; 24/263 DA; 166/120, 212, 217; 269/22; 279/2 A; 285/97; 403/5

[56] References Cited

U.S. PATENT DOCUMENTS

| 2,589,101 | 3/1952 | Leguillon et al. | 294/63 A X |
| 2,756,883 | 7/1956 | Schreck | 294/99 R X |
| 3,272,266 | 9/1966 | Kennard | 294/86.3 X |
| 3,534,996 | 10/1970 | De Witt | 294/102 R |
| 3,834,169 | 9/1974 | Abbott | 269/22 X |
| 4,052,861 | 10/1977 | Malone et al. | 294/86.15 X |

FOREIGN PATENT DOCUMENTS

| 2412628 | 9/1974 | Fed. Rep. of Germany | 294/63 A |
| 1132160 | 3/1957 | France | 403/5 |
| 1307942 | 9/1962 | France | 294/67 BC |

Primary Examiner—Johnny D. Cherry
Attorney, Agent, or Firm—Sughrue, Mion, Zinn, Macpeak and Seas

[57] ABSTRACT

A soft retaining gripper for gripping a surface while stresses are exerted in a longitudinal direction parallel to the surface between the gripper and the surface, comprises a jaw and an inflatable flexible bladder carried by the jaw, the bladder being in use inflated to grip the surface. To prevent creep of the gripper in use, a wall is associated with the bladder and extends between the bladder and the surface, the wall being made of a composite anisotropic material comprising elongate elements which are oriented to extend in the longitudinal direction and are practically inextensible and a flexible synthetic resin in which the elongate elements are embedded, the elongate elements being anchored to the jaw at at least that end in the direction of which creep might otherwise occur.

3 Claims, 8 Drawing Figures

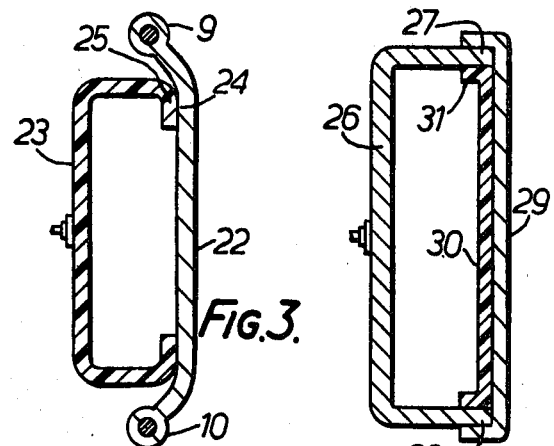
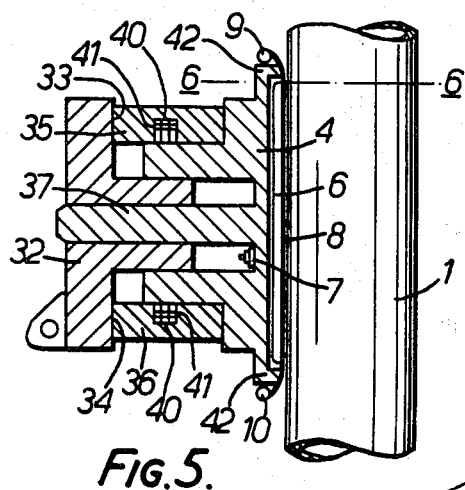
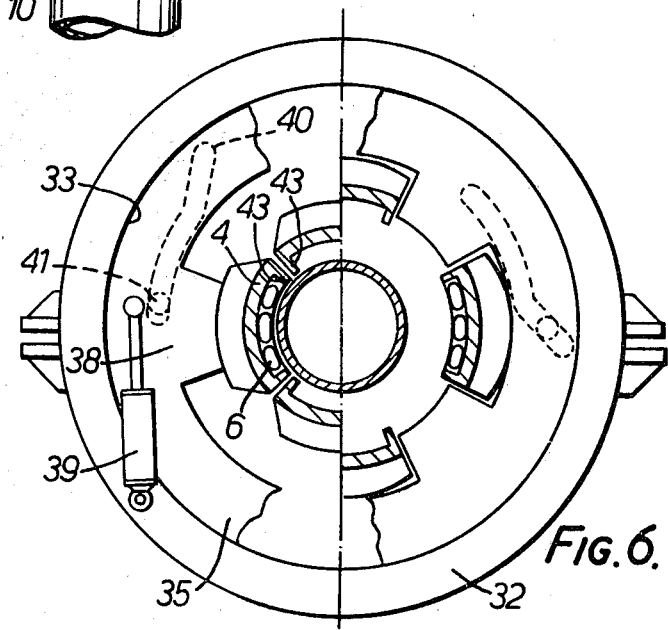

RETAINING GRIPPERS

The invention relates to improvements in a retaining gripper which is applied flexibly against a surface and produces between the gripper and the surface a connection capable of withstanding stresses parallel to this surface, which will be called longitudinal stresses. The purpose of the gripper may be to hold the surface to which these longitudinal stresses are applied, or the gripper may be fastened to a member which is subjected to the longitudinal stresses and which it is desired to hold in position relative to the surface.

The surface may have various configurations; it may in particular be plane, polygonal, or cylindrical. The invention will be described more particularly with reference to an outside or inside cylindrical surface, but is not intended to be limited to a configuration of this kind.

It is known that it is possible to produce a high-power retaining gripper which does not entail the risk of damaging a coating applied to the surface in question, and in which a wall of the gripper adapts itself to irregularities of the surface and its coating in such a manner as to effect a good distribution of the pressure over the entire surface, by using a flexible jack comprising a bladder of elastomeric material reinforced by synthetic filaments, the bladder being inflated with a fluid under pressure.

It has however been found that flexible jacks of this type are not suitable when the longitudinal stresses are very considerable; this is due to the phenomenon known as "creeping", in which the bladder tends to roll over itself through relative displacement of the face applied against the surface in question in relation to the opposite face bearing against a jaw of the gripper, and which produces a relative displacement of the gripper and the surface against which it is applied.

According to the invention, there is provided a soft retaining gripper comprising at least one rigid jaw, at least one jack comprising an inflatable flexible bladder carried by said jaw, a flexible wall arranged to be applied by said bladder against a surface to be gripped while stresses are exerted in the longitudinal direction between said gripper and the surface and parallel to said wall, said flexible wall being made of a composite anisotropic material comprising elongate elements which are oriented in the longitudinal direction, which have practically zero elongation in said longitudinal direction, and which are embedded in a covering of a flexible synthetic resin, at least one support member solid with said jaw, and means attaching said elements to at least one said support member disposed adjacent one longitudinal end of said jack.

The support member, which is advantageously disposed upstream in relation to the direction of the longitudinal stresses tending to move the wall, retains the wall and prevents its deformation. The term "longitudinal" will be applied herein to whatever lies in the direction of the said longitudinal stresses.

It is advantageous for these elongate elements, which are oriented in the longitudinal direction and have practically zero elongation in that direction, to be taken from the group comprising chains, mesh, metal bars, and synthetic textiles, and to be enclosed in a covering of a flexible synthetic resin taken from the group comprising plastomers and elastomers.

Among synthetic textiles, particular mention may be made of those based on polyamides and polyesters and also of the material marketed under the name KEVLAR.

If the longitudinal stresses may be applied in two opposite directions, the elongate elements should be attached to two support members disposed respectively near the two longitudinal ends of the jack, as previously defined.

The wall may be independent of the bladder of the jack, the bladder exerting essentially a transverse thrust stress and the wall exerting a longitudinal retaining stress. However, the bladder may also participate in the longitudinal retaining stress. It has been found that the longitudinal stress is divided in the approximate proportion of two-thirds to the wall and one-third to the bladder when there is good adherence between wall and bladder. The extent of participation of the wall in this stress could obviously be increased by providing sliding contact between wall and bladder.

Alternatively, the wall may be attached, for example by adhesive bonding, to a part of the wall of the bladder.

Indeed, the wall may constitute a part of the wall of the bladder, the remainder of the wall of the bladder being connected at its ends, for example by adhesive bonding, to the edge portions of this wall. In a modification, the remainder of the wall of the bladder may be provided by a rigid frame with a sealing skin, the rigid frame forming the support members for the fastening of the wall.

In a gripper according to the invention, comprising an inflatable flexible bladder and a flexible wall fastened to at least one support member, the displacement of the flexible wall in relation to the rigid jaw, between the working position in which the bladder is inflated and the position of rest, is very slight. For certain applications it may be advantageous to increase the clearance between gripper in its rest position and surface.

For this purpose the gripper may comprise, between the rigid jaw of the gripper and a carrier frame, a modifiable wedging means enabling the jaw to be moved towards and away from the frame and consequently away from and towards the surface against which the wall is to be applied.

The wedging means may be provided in various ways, for example using screw jacks. Alternatively for a gripper comprising a plurality of jaws disposed on a circumference and mounted on a frame, on which they are guided in the radial direction, these jaws being intended to grip a cylindrical part disposed inside the circumference in question, the wedging means may comprise at least one set of radial wedges, the number of which is equal to the number of jaws, and which are carried internally by a crown which is disposed between the frame and the jaws and which bears externally against a track on the carrier frame and is adapted to be displaced rotationally by a jack acting between the frame and the crown, guide ramps being inserted between the crown and each jaw to move the jaws radially by a distance corresponding to the radial thickness of the wedges when the crown is rotated.

The jaws are preferably guided radially in a longitudinally central portion of the frame, the central portion being bordered by two longitudinally terminal portions acted upon by two sets of radial wedges, as described above.

Embodiments of the invention will now be described by way of example only with reference to the accompanying drawings.

In the drawings:

FIGS. 3 and 4 are very schematic partial sections of two embodiments of bladders and associated walls of grippers;

Figure 7:
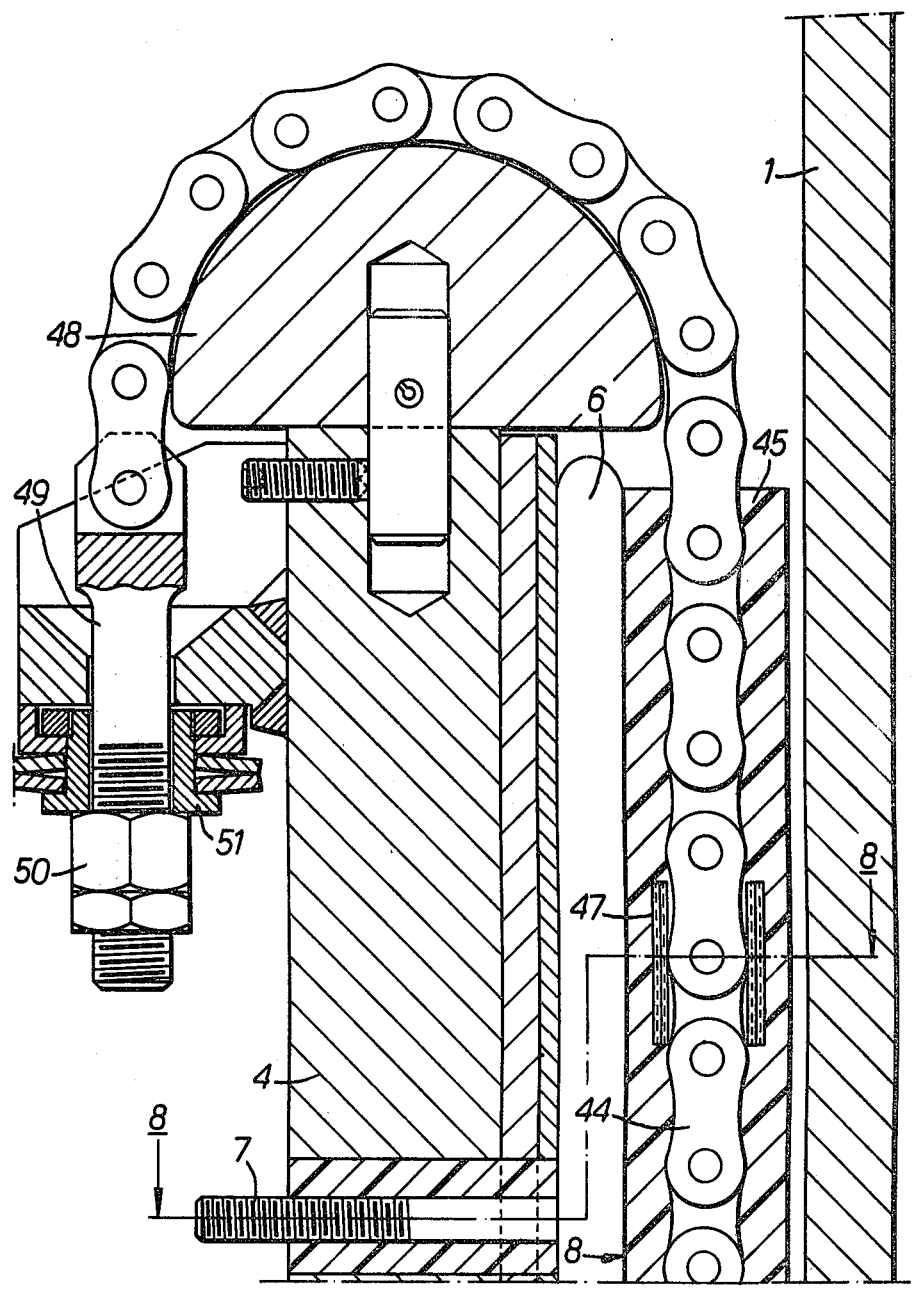
Figure 8:
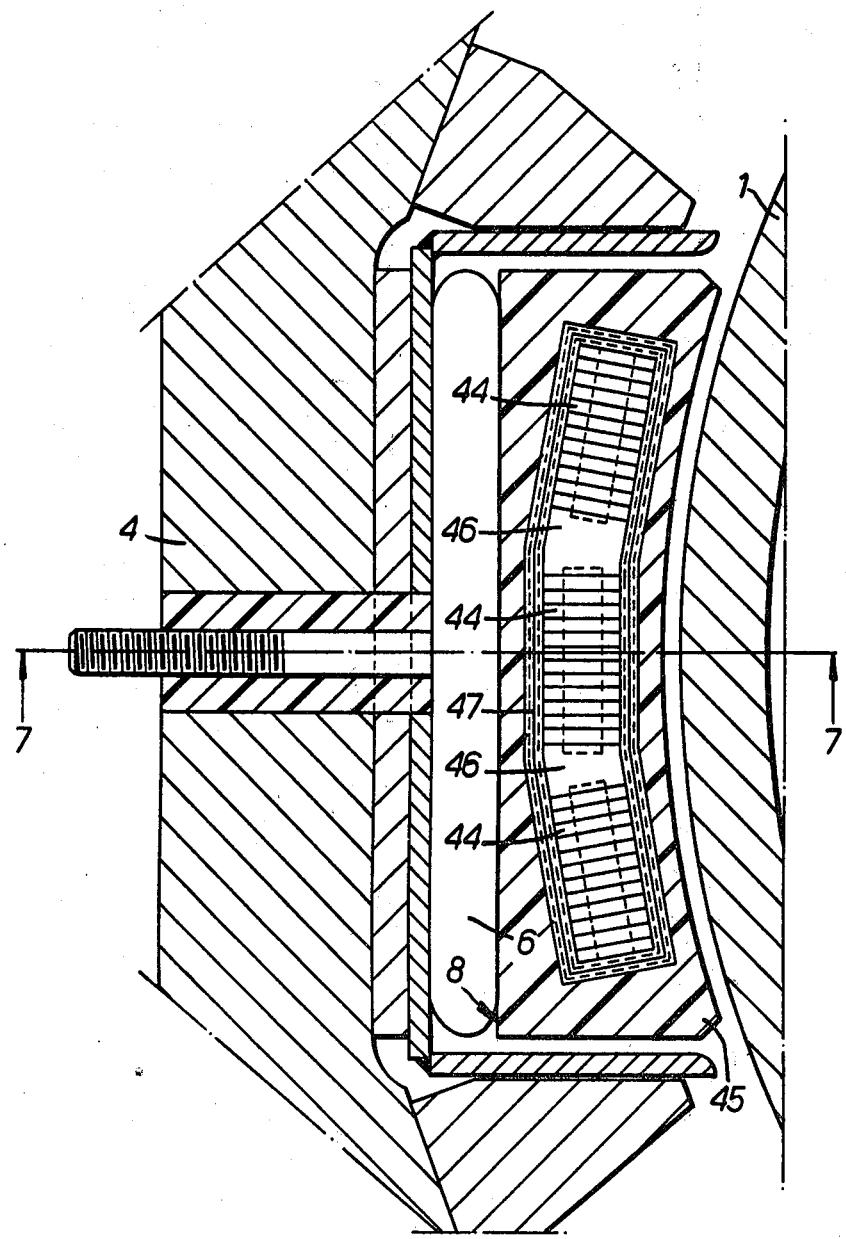

FIGS. 5 and 6 show respectively, in longitudinal section and in section along the line 6—6 in FIG. 5, an embodiment of a gripper providing considerable clearance, and disposed around a cylindrical piece; and FIGS. 7 and 8 show respectively in longitudinal section and in cross-section, on a larger scale, a portion of an embodiment of a gripper.

Figure 1:
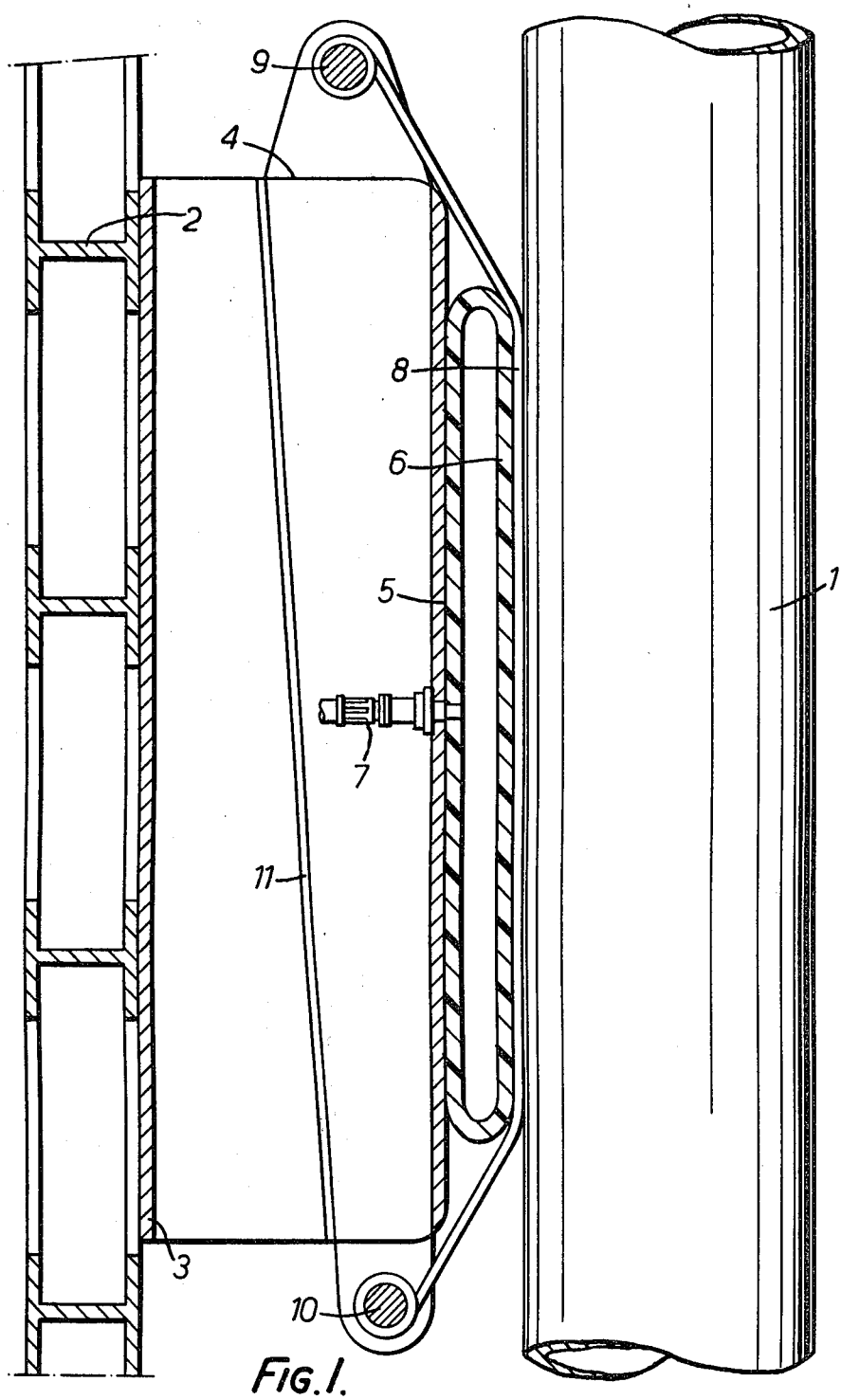
FIG. 1 is a partial longitudinal section of the left-hand part of an embodiment of a gripper according to the invention gripping a cylindrical piece.

In FIG. 1 a cylindrical piece 1 is gripped by a gripper, which has been shown only in the left-hand part of the Figure. This gripper is carried by a carrier frame 2 provided with brackets 3, on which are fastened jaws 4 provided with flexible jacks 5. The jacks 5 comprise bladders 6 which are supplied wih fluid under pressure by connectors 7. Between each bladder 6 and the cylindrical piece 1 is interposed a wall 8, whose general shape is that of a sector of a cylinder and which is made of a material as described above having practically no elongation in the longitudinal direction parallel to the generatrices of the cylindrical piece 1, while being flexible in the transverse direction and being capable of compression when pressed by the bladder 6 against the cylindrical piece 1. The wall 8 is fastened to supports consisting of ring portions 9 and 10 carried by jaws 4 on each side, in the longitudinal direction, of the jacks 5. The wall is tensioned when the jack 5 is in operation. The number of jaws 4 disposed around the piece 1 may for example be three or four.

In the embodiment illustrated it is assumed that the piece 1 is subject to a thrust directed downwards (in the Figure) in the longitudinal direction parallel to the generatrices of the cylindrical piece 1. For this purpose the jaws 4 have been mounted on the brackets 3 along inclined surfaces 11 having a wedge action.

A resilient return system may be provided for the wall 8. This system may for example comprise an intermediate resilient member interposed between the wall 8 and the ring portion 10, if the thrust is directed exclusively downwards. In the case of stresses which may be directed in both directions, either downwards or upwards, if it is not desired to allow the wall 8 to float when the jack 5 is not in operation, at least one of the ring portions 9 and 10 may be installed in an elongate aperture provided in the jaw 4, in such a manner that, in the operative position of the jack 5, the ring portion bears rigidly against one end of the aperture, while in the non-operative position of the jack 5, the ring portion is resiliently moved away from this stop position. These arrangements have not been shown in the drawings.

The fastening of the wall 8 to the ring portions 9 and 10 presents no difficulty. These ring portions are for example threaded into a looped portion of the corresponding end of the wall 8. If the material of which the wall 8 is made is in the form of metal chains, the ring portions 9 and 10 may pass through these chains, particularly in a part of the chain which projects longitudinally from the flexible resin covering in which the chains are embedded.

Tests made with walls 8 in which the inextensible elements are of KEVLAR have shown that it is possible to retain a piece 1 on which a thrust of more than 240 tons is exerted, about two-thirds of this thrust being taken by the supports of the walls 8, and the walls 8 being elongated by about 1%.

Figure 2:
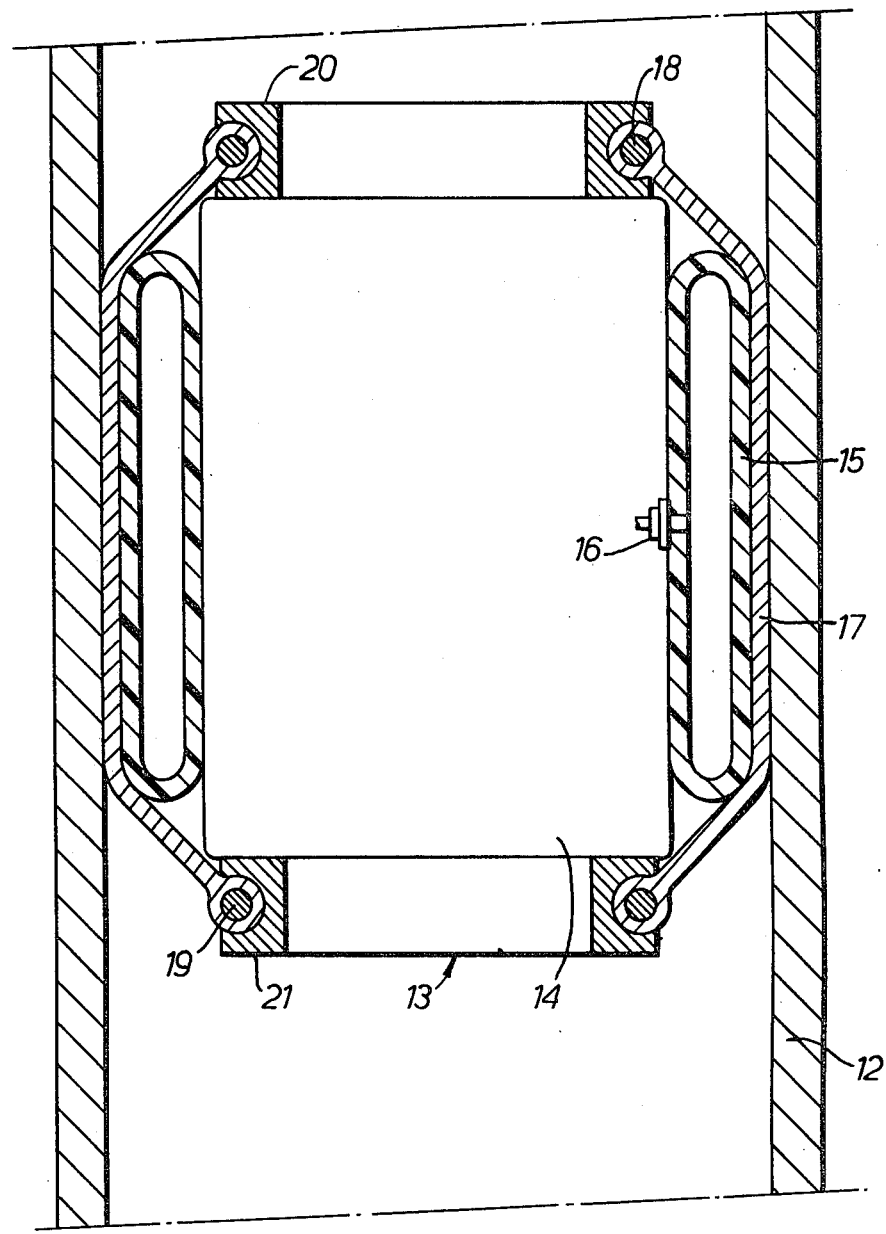
FIG. 2 is a partial longitudinal section of another embodiment of a gripping device disposed inside a cylindrical pipe to serve as stop means.

In FIG. 2 there is shown a cylindrical pipe 12 inside which is stop means 13 in the form of a gripper and which must hold itself in place against the action of a force applied to it in the longitudinal direction of the pipe. The body 14 of the stop means 13 is surrounded by at least one flexible jack 15 adapted to be inflated via a connection 16. A wall 17 of generally cylindrical shape surrounds the flexible jack 15 on its outer periphery. This wall 17 is attached to metal rings 18, 19 carried by the body 14, with the aid of support pieces 20, 21, at the longitudinal ends of the body 14. The wall 17 serves a similar purpose to that of the wall 8, and it too has practically zero elongation in the longitudinal direction parallel to the generatrix of the pipe 12.

The stop means 13 can retain any device in the pipe 12. It can in particular retain sealing devices disposed in another axial location and connected to the stop means 13 by suitable mechanical connection, the combination of the sealing devices and the stop means 13 forming an obturator intended to isolate two internal portions of a pipe.

The walls 8 and 17 may be separate from the walls of the bladders of the jacks 5 and 15, but they may also be joined to the walls, for example by adhesive bonding.

In FIG. 3 there is shown a flexible jack in which a wall 22, for example similar to the wall 8 in FIG. 1, forms a portion of the wall of the bladder of this jack, the remainder 23 of the wall of the bladder being fastened to the edges of the wall 22, for example by adhesive bonding along contact surface 24 of wall portion 25.

In FIG. 4, a jack as shown comprising a metal frame 26 to which is fixed, at its longitudinal ends 27 and 28, a wall 29, for example of the type of the wall 8 in FIG. 1, while a flexible skin 30 effects sealing. Skin 30 being for example fixed along its ends 31 to the edges of the frame 26 and being applied against the inside surface of the wall 29. In this embodiment, frame 26 and skin 30 define the flexible bladder.

FIGS. 5 and 6 show an embodiment of a gripper for gripping a cylindrical piece 1 of the kind shown in FIG. 1 but which is adapted to provide substantial clearance. This gripper comprises four jaws 4, each of which carries one or more bladders 6 and at least one wall 8 which is fastened to ring portions 9 and 10. A frame 32 surrounds the entire gripper and provides on its inner face two tracks 33 and 34 for respective movable crowns 35 and 36. Between these two tracks a longitudinally central portion of the frame 32 is provided with guide means 37 in the form of strong plates, which enable the jaw 4 to be held in the frame 32 and to be capable of only radial displacement relative to the piece 1.

Each of the movable crowns 35, 36 forms internally four wedges 38 which project radially. The circumferential space lying between two adjacent wedges is sufficient to receive a jaw 4 in its retracted radially outer position when the gripper is not in operation, while each of the wedges holds a jaw 4 in its advanced radially inner operative position when the gripper is in operation. The jaws 4 are moved from their advanced position to their retracted position by rotation of the crowns 35 and 36 relative to the frame 32, this rotation being controlled by jacks, such as the jack 39. To enable the jaws 4 to pass from one position to the other and to be held in their retracted position, they are guided by guide ramps 40 formed by four slots made one in each crown 35 and 36 and its wedges 38. Guide rollers 41 mounted resiliently on each jaw 4 slide in a respective pair of ramps. This resilient mounting moves the jaws 4 away from the support wedges 38 when the bladders 6 are deflated, thus facilitating the rotation of the crowns 35, 36.

In FIGS. 5 and 6 it will be noted that flanges 42 and 43 have been provided respectively at the longitudinal and lateral ends of each jaw 4 in order to ensure better support for the bladders 6, which are thus retained in sockets defined by these flanges. Depending on the type of utilisation and on the stresses applied, flanges of this kind need be installed only at certain ends or they may be dispensed with entirely.

This device can be used in the handling of petroleum product pipes, and more particularly to the laying of such pipes at sea, especially for J-laying, in operations of matching, welding, and forging tubes and retaining, where the gripper serves as a tensioner. It permits ample clearance in the non-operative state of the gripper, together with excellent gripping when the gripper is in operation. Outstanding performance is achieved with small dimensions.

FIGS. 7 and 8 show in greater detail one example of construction of a wall 8 and its fastening to one of the longitudinal ends of the gripper. In this example the inextensible elements of the wall 8 are formed by chains 44 having a plurality of links in parallel (two times six links). Each jaw 4, the socket of which is lined internally with tetrafluoroethylene, is provided with a bladder 6 (shown not in section), and is associated with the wall 8 which is made of a flexible synthetic resin 45 in which are embedded three chains 44 separated from one another by wedges 46 and joined together at intervals by two layers of synthetic fabric 47.

The fastening of the end of a chain 44 is shown in FIG. 7. The chain 44 passes over a guide 48 carried by the jaw 4, and a threaded pin 49 attached to the end of the chain is secured by a nut 50 to a support 51 carried by the jaw 4.

The invention is not intended to be limited to the particular arrangements which have been described in connection with these embodiments, but extends to all modifications which can be made to them without departing from the general definition of the invention.

What is claimed is:

1. A soft retaining gripper comprising at least one rigid jaw, at least one jack comprising an inflatable flexible bladder carried by said jaw, a flexible wall arranged to be applied by said bladder against a surface to be gripped while stresses are exerted in the longitudinal direction between said gripper and the surface and parallel to said wall, said flexible wall being made of a composite anisotropic material comprising elongate elements which are oriented in the longitudinal direction and which are selected from a group comprising chains, mesh, metal bars and synthetic textiles, which have practically zero elongation in said longitudinal direction, and which are embedded in a covering of a flexible synthetic resin selected from a group comprising plastomers and elastomers, two support members solid with said jaw and disposed respectively adjacent the longitudinal ends of said jack, means attaching said flexible wall to said support members, and a carrier frame and a retractible wedging means inserted between said jaw and said carrier frame and enabling said jaw to be moved towards and away from said carrier frame.

2. A soft retaining gripper comprising at least one rigid jaw, at least one jack comprising an inflatable flexible bladder carried by said jaw, a flexible wall arranged to be applied by said bladder against a surface to be gripped while stresses are exerted in the longitudinal direction between said gripper and the surface and parallel to said wall, said flexible wall being made of a composite anisotropic material comprising elongate elements which are oriented in the longitudinal direction, which have practically zero elongation in said longitudinal direction, and which are embedded in a covering of a flexible synthetic resin, at least one support member solid with said jaw, means attaching said elements to at least one said support member disposed adjacent one longitudinal end of said jack, and a carrier frame and an adjustable wedging means inserted between said jaw and said carrier frame and enabling said jaw to be moved towards and away from said carrier frame, and wherein said wedging means comprises a crown which is disposed between said jaw and said carrier frame, and said jaw bears externally against a track of said carrier frame and is rotatable relative to said carrier frame, another jack acting between said carrier frame and said crown for rotationally displacing said crown relative to said carrier frame, at least one set of radial wedges, the number of which is equal to the number of jaws, carried internally by said crown, and guide ramp means arranged between said crown and said jaw for moving said jaw radially by a distance corresponding to the radial extent of said wedge as said crown is rotated.

3. A gripper according to claim 2, wherein said wedging means comprises two sets of radial wedges disposed one on each side of a longitudinally central portion of said carrier frame for radially guiding said jaw.

* * * * *